United States Patent Office 3,116,995
Patented Jan. 7, 1964

3,116,995
METHOD FOR DESTROYING UNDESIRED PLANT LIFE
Joe R. Willard and Kenneth P. Dorschner, Middleport, N.Y., assignors to FMC Corporation, a corporation of Delaware
No Drawing. Filed Jan. 24, 1961, Ser. No. 84,513
3 Claims. (Cl. 71—2.6)

This invention relates to new and particularly effective compositions for the control of undesired vegetation. Specifically, this invention relates to herbicidal compositions containing methyl N - (3,4 - dichlorophenyl)carbamate, and to the use of these herbicidal compositions to control undesired vegetation.

The herbicidal activity of many N-phenylcarbamates has been discussed in the literature, and some compounds of this class have been widely used in agriculture, such as the compounds 2-propyl N-phenylcarbamate and 2-propyl N-(3-chlorophenyl)carbamate. These two compounds have, in fact, come to be used as reference compounds for the comparison and evaluation of related compounds. Thus, for example, Shaw and Swanson (Weeds, 2, 43–65 (1953)) in a study of the pre-emergent herbicidal properties of an extensive series of carbamates, showed the compound 2-propyl N-(3-chlorophenyl)carbamate to be a much more effective herbicide, with a rating of 1520 on their scale, than the corresponding 2-propyl N-(3,4-dichlorophenyl)carbamate, with a rating of 770.

In another report, studying the action of alkyl N-phenylcarbamates on the photolytic activity of isolated chloroplasts, Moreland and Hill (J. Agr. Food Chem. 7, 832 (1959)) demonstrated that 2-propyl N-(3,4-dichlorophenyl)carbamate was approximately nine times more effective than the corresponding 3-chlorophenylcarbamate and 36 times more effective than the corresponding N-phenylcarbamate, in ability to inhibit the photolytic reaction of these chloroplasts. They also showed the methyl ester of N-(3-chlorophenyl) carbamate to be approximately one half as active as the corresponding 2-propyl ester in their tests.

In another study, Freed (Science, 111, 285 (1950)) attempted to correlate certain physical constants with the pre-emergent phytotoxicity of a series of alkyl N-phenylcarbamates. In this series, growth inhibition with variation in alkyl groups decreased in the order 2-propyl, ethyl, methyl, and 1-propyl, with the growth rates increasing from 0 for the 2-propyl group to 35.4, 99.7, and 104.2 milligrams per plant, respectively. In an earlier study, Templeton and Sexton (Nature, 156, 630 (1945)) had reported methyl N-phenylcarbamate to be less active herbicidally than ethyl N-phenylcarbamate, which was approximately one third as active as 2-propyl N-phenylcarbamate.

Contrary to the trend observed by all of these workers, we have found that the compound methyl N-(3,4-dichlorophenyl)-carbamate exhibits outstanding herbicidal activity, far superior to the activity of its homologous ethyl and isopropyl esters, as well as to the activity of isomeric N-chlorophenylcarbamates.

Methyl N-3,4-dichlorophenyl)carbamate is a known compound, and was reported by Siefken, Ann., 562, 116 (1949). It may be prepared by known procedures for the preparation of alkyl N-phenylcarbamates, such as by reacting 3,4-dichloroaniline with methyl chloroformate, or by reacting methanol with 3,4-dichlorophenyl isocyanate. Typical preparations are illustrated in the following examples:

EXAMPLE I

In a flask were placed 40.5 g. of 3,4-dichloroaniline, 23.8 g. of methyl chloroformate and 250 ml. of benzene. While stirring the cloudy solution at room temperature, 30.3 g. of dimethylaniline was added dropwise. The solution was refluxed for one hour, cooled to room temperature, washed with 5% hydrochloric acid and with water. A white solid crystallized at once, and was separated by filtration and dried, to yield 21 g. of methyl N-(3,4-dichlorophenyl)carbamate, M.P. 112–114° C.

EXAMPLE II

In a flask fitted with stirrer, thermometer, condenser and powder funnel was placed 750 ml. of methanol. While stirring at room temperature, a total of 470 g. of 3,4-dichlorophenyl isocyanate was added, slowly enough to maintain the temperature of the exothermic reaction below 60° C. The clear solution was then refluxed for 30 minutes, and allowed to cool. On cooling a white solid crystallized to a dense cake. This cake was triturated in hexane, collected, washed and dried, to yield 474 g. of methyl N-(3,4-dichlorophenyl)carbamate, M.P. 108–111° C.

For herbicidal application, methyl N-(3,4-dichlorophenyl)carbamate may be incorporated and formulated with any of the adjuvants and carriers normally employed for facilitating the dispersion of active ingredients for agricultural applications, recognizing the accepted fact that the formulation and mode of application of a toxicant may affect the activity of the material in a given application. For pre-emergent application, these herbicidal compositions are usually applied either as sprays, dusts or granules to the area in which suppression of vegetation is desired. For the post-emergent control of established plant growth, sprays or dusts are commonly used.

For these applications, the methyl N-(3,4-dichlorophenyl)-carbamate may be formulated as a granule of relatively large particle size, as a powdery dust, as a wettable powder, as an emulsifiable concentrate, as a solution, or as one of the less common types of formulations, depending on the desired mode of application.

Dusts are admixtures of the active ingredient with finely divided solids such as talc, attapulgite clay, kieselguhr, pyrophyllite, chalk, diatomaceous earths, calcium phosphates, calcium and magnesium carbonates, sulfur, lime, flours, and other organic and inorganic solids which act as dispersants and carriers for the toxicant. These finely divided solids have an average particle size less than about 50 microns. Since the instant toxicant is a solid, normally a concentration of about 80% by weight of active ingredient is the maximum concentration which a non-absorbent dust can accommodate. A typical dust formulation useful herein contains, for example, 10.0 parts of methyl N-(3,4-dichlorophenyl)-carbamate, 30.0 parts of bentonite clay and 60.0 parts talc.

Wettable powders, also useful formulations for both pre- and post-emergent herbicides, are in the form of finely divided particles which disperse readily in water or other dispersant. The wettable powder is ultimately applied to the soil either as a dry dust or as an emulsion in water or other liquid. Typical carriers for wettable powders include fuller's earth, kaolin clays, silicas, and other highly absorbent, readily wet inorganic diluents. Wettable powders normally are prepared to contain about 5–50% of active ingredient, depending on the absorbency of the carrier, and usually also contain a small amount of a wetting, dispersing or emulsifying agent to facilitate dispersion. For example, a useful wettable powder formulation contains 25.0 parts of methyl N-(3,4-dichlorophenyl)carbamate, 72.0 parts of bentonite clay and 1.5 parts each of sodium lignosulfonate and sodium laurylsulfonate as wetting agents.

Other useful formulations for herbicidal application are the emulsifiable concentrates, which are homogeneous liquid or paste compositions which are readily dispersed in water or other dispersant, and may consist entirely of the solid methyl N-(3,4-dichlorophenyl)carbamate with a liquid or solid emulsifying agent, or may also contain a liquid carrier, such as xylene, heavy aromatic naphthas, isophorone and other non-volatile organic solvents. For herbicidal application these concentrates are dispersed in water or other liquid carrier, and normally applied as a spray to the area to be treated. The percentage by weight of the essential active ingredient may vary according to the manner in which the composition is to be applied but in general comprises 0.5 to 95 percent by weight of the herbicidal composition.

Typical wetting, dispersing or emulsifying agents used in agricultural formulations include, for example, the alkyl and alkylaryl sulfonates and sulfates and their sodium salts; alkylamide sulfonates, including fatty methyl taurides; alkylaryl polyether alcohols; sulfated higher alcohols; polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface active agents are available in commerce. The surface active agent, when used, normally comprises from 1 percent to 15 percent by weight of the herbicidal composition.

Other useful formulations for herbicidal applications include simple solutions of the active ingredient in a dispersant in which it is completely soluble at the desired concentration, such as acetone or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the Freons, may also be used.

The formulation and application of the herbicide of this invention is illustrated in the following examples, wherein all parts and percentages are by weight:

EXAMPLE III

The post-emergent herbicidal activity of methyl N-(3,4-dichlorophenyl)carbamate was demonstrated as follows: In flat pans was placed, to a depth of three inches sterile sandy loam soil. In the soil were than planted seeds of lima beans, corn, cotton and oats, at a depth of one and one half inches; and seeds of flax, carrots, lettuce, mustard and ryegrass, at a depth of one half inch. The flats were watered, and the seeds allowed to grow in the greenhouse for about three weeks, or the time required for the first trifoliate leaf to appear on the lima beans. Maintaining an untreated control, the stand of plants was then treated as follows: a solution of 2.88 g. of methyl N-(3,4-dichlorophenyl)carbamate in 125 ml. of acetone was sprayed on the plants, in the amount equivalent to 6 pounds of toxicant per acre, in a volume of acetone equivalent to 41.6 gallons per acre. The number of surviving plants were counted, and the percent kill with respect to the untreated control was determined. Results are presented in Table 1 below:

Table 1.—Post-Emergent Herbicidal Activity of Methyl N-(3,4-Dichlorophenyl)Carbamate

| Plant: | Percent kill |
| --- | --- |
| Lima beans | 100 |
| Corn | 100 |
| Cotton | 100 |
| Flax | 100 |
| Oats | 100 |
| Carrots | 100 |
| Lettuce | 100 |
| Mustard | 100 |
| Ryegrass | 100 |

EXAMPLE IV

Pre-emergent herbicidal activity was demonstrated as follows: Flats were prepared and planted as in Example III. As soon as the seeds were planted and the flats watered, the soil was sprayed with the toxicant solution in the manner described in Example III, at the amount equivalent to 8 pounds of toxicant per acre. Both the treated flats and the untreated control were held in the greenhouse for three weeks, after which time the performance of the toxicant was assessed in terms of percent kill with respect to the control. The results tabulated below show that methyl N-(3,4-dichlorophenyl)carbamate shows excellent pre-emergent activity under these conditions:

Table 2.—Pre-Emergent Herbicidal Activity of Methyl N-(3,4-Dichlorophenyl)Carbamate

| Plant: | Percent kill |
| --- | --- |
| Lima beans | 0 |
| Corn | 0 |
| Cotton | [1] 50 |
| Flax | 100 |
| Oats | [1] 20 |
| Carrots | 0 |
| Lettuce | 100 |
| Mustard | 100 |
| Ryegrass | 100 |

[1] Injury to survivors.

The herbicidal compositions of this invention may be formulated and/or applied with insecticides, fungicides, nematocides, plant growth regulators, fertilizers, and other agricultural chemicals. In applying the herbicide of this invention, whether formulated alone or with other agricultural chemicals, a herbicidal amount and concentration of the toxicant methyl N-(3,4-dichlorophenyl)carbamate should of course be employed.

It is apparent that various modifications may be made in the formulation and application of the herbicide of this invention, without departing from the novel concept herein, as defined in the following claims.

We claim:
1. The method of destroying undesired plant life which comprises applying a herbicidal amount and concentration of methyl N-(3,4-dichlorophenyl)carbamate to the locus to be protected.
2. The method of destroying undesired plant life prior to emergence which comprises applying a herbicidal amount and concentration of methyl N-(3,4-dichlorophenyl)carbamate to the soil containing said undesired plant life.
3. The method of destroying undesired plant life after emergence from the soil which comprises applying a herbicidal amount and concentration of methyl N-(3,4-dichlorophenyl)carbamate to said undesired plant life.

References Cited in the file of this patent

UNITED STATES PATENTS 2,776,197   Gysin et al. _____ Jan. 1, 1957

FOREIGN PATENTS 780,713   Great Britain _____ Aug. 7, 1957

OTHER REFERENCES

Siefken: "Annalen der Chemie," vol. 562, 1949, page 116.

Shaw et al.: "Weeds," vol. 2, No. 1, January 1953, pages 43–65.

George: "J. Agr. Food Chem.," vol. 2, No. 19, September 1954, pages 990–995.